United States Patent [19]
Yamamura et al.

[11] 3,843,919
[45] Oct. 22, 1974

[54] DC-TO-DC CONVERTER

[75] Inventors: Hisashi Yamamura; Katuo Hosoi, both of Tokyo, Japan

[73] Assignee: Nippon Telegraph and Telephone Public Corporation, Tokyo, Japan

[22] Filed: July 12, 1973

[21] Appl. No.: 378,714

[30] Foreign Application Priority Data
July 20, 1972   Japan.............................. 47-72073

[52] U.S. Cl....................... 321/2, 321/18, 321/45 R
[51] Int. Cl............................................. H02m 3/32
[58] Field of Search................... 321/2, 18, 45 R

[56] References Cited
UNITED STATES PATENTS

| | | |
|---|---|---|
| 3,304,487 | 2/1967 | McCaskey, Jr. ................. 321/18 X |
| 3,325,716 | 6/1967 | Gomi ..................................... 321/2 |
| 3,335,360 | 8/1967 | Reinert ............................. 321/18 X |
| 3,611,105 | 10/1971 | Sautel ................................. 321/2 |
| 3,621,361 | 11/1971 | Barth ............................... 321/18 X |
| 3,656,046 | 4/1972 | Parke .......................... 321/45 R X |
| 3,657,631 | 4/1972 | Martens et al. ........................ 321/2 |

OTHER PUBLICATIONS
RCA Silicon Power Circuits Manual, Technical Series SP-5C, pp. 134, 135, 1967.

*Primary Examiner*—R. N. Envall, Jr.
*Attorney, Agent, or Firm*—Wolfe, Hubbard, Leydig, Voit & Osann, Ltd.

[57] ABSTRACT

A DC-to-DC converter of the type the input and output sides are insulated, wherein the circuit for supplying power to control circuit for power converting circuit is simplified. The power supply circuit comprises a reactor having primary winding inserted in series between DC power source and the power converting circuit and secondary winding adapted to take out an energy responsive to rush current into the primary winding, a condenser for storing and supplying the energy to the control circuit, and a means for continuously supplying a partial output from the power converting circuit to the condenser.

4 Claims, 10 Drawing Figures

DC-TO-DC CONVERTER

This invention relates to DC-to-DC converters and, more particularly, to a DC-to-DC converter in which the input side and output side are perfectly electrically insulated from each other and which has a starting circuit stable in starting and made to be perfectly static.

Generally this kind of DC-to-DC converter comprises an electronic power converting circuit, a control circuit for controlling said electronic power converting circuit and an electronic power supply circuit for driving the control circuit. However, in the above DC-to-DC converter, it is necessary that the input side and output side should be insulated from each other and also, in the control circuit and the electronic power supply circuit for the control circuit, it is necessary that the input side and output side should be electrically insulated from each other. In the DC-to-DC converter referred to, it is necessary to provide an electronic power supply circuit for the control circuit, and there are various defects in making it small, light and economical. The present invention is suggested to remove such defects.

A main object of the present invention is to provide a DC-to-DC converter which is static and employs an economical power supply means to the control circuit formed with a fewer parts.

Another object of the present invention is to provide a DC-to-DC converter which can be simplified by forming a current transformer for an electric power source utilizing a filter on the input side used for the purpose of preventing noises from flowing out to the input side.

A further object of the present invention is to provide a DC-to-DC converter which can be added to conventional apparatuses and can be formed of a fewer additional parts.

Other objects and advantages of the present invention will be easily understood from the following disclosures wherein the present invention shall be explained in detail with reference to the accompanying drawings, in which.

Figure 1:
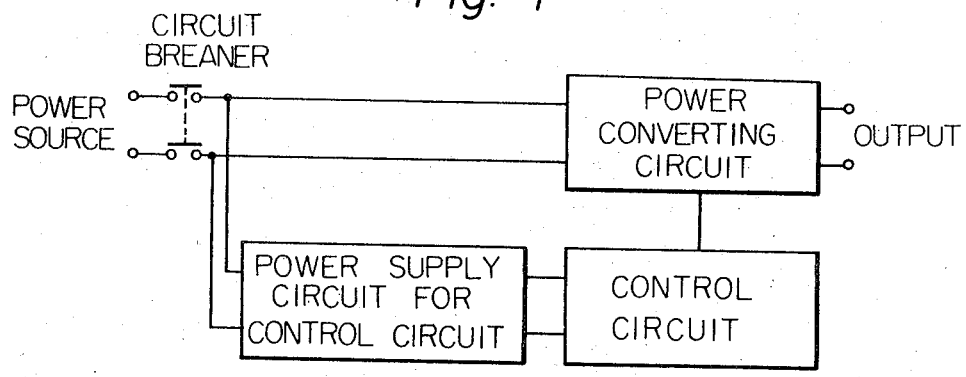
FIG. 1 shows a basic circuit arrangement in block diagram of the DC-to-DC converter in general.

The general DC-to-DC converter shown in FIG. 1 comprises an electric power source, a circuit breaker connected with said electric power source, an electric power converting circuit connected through said circuit breaker to the power source, a control circuit for controlling said electronic power converting circuit, and an electronic power supply circuit for said control circuit.

Figure 2:
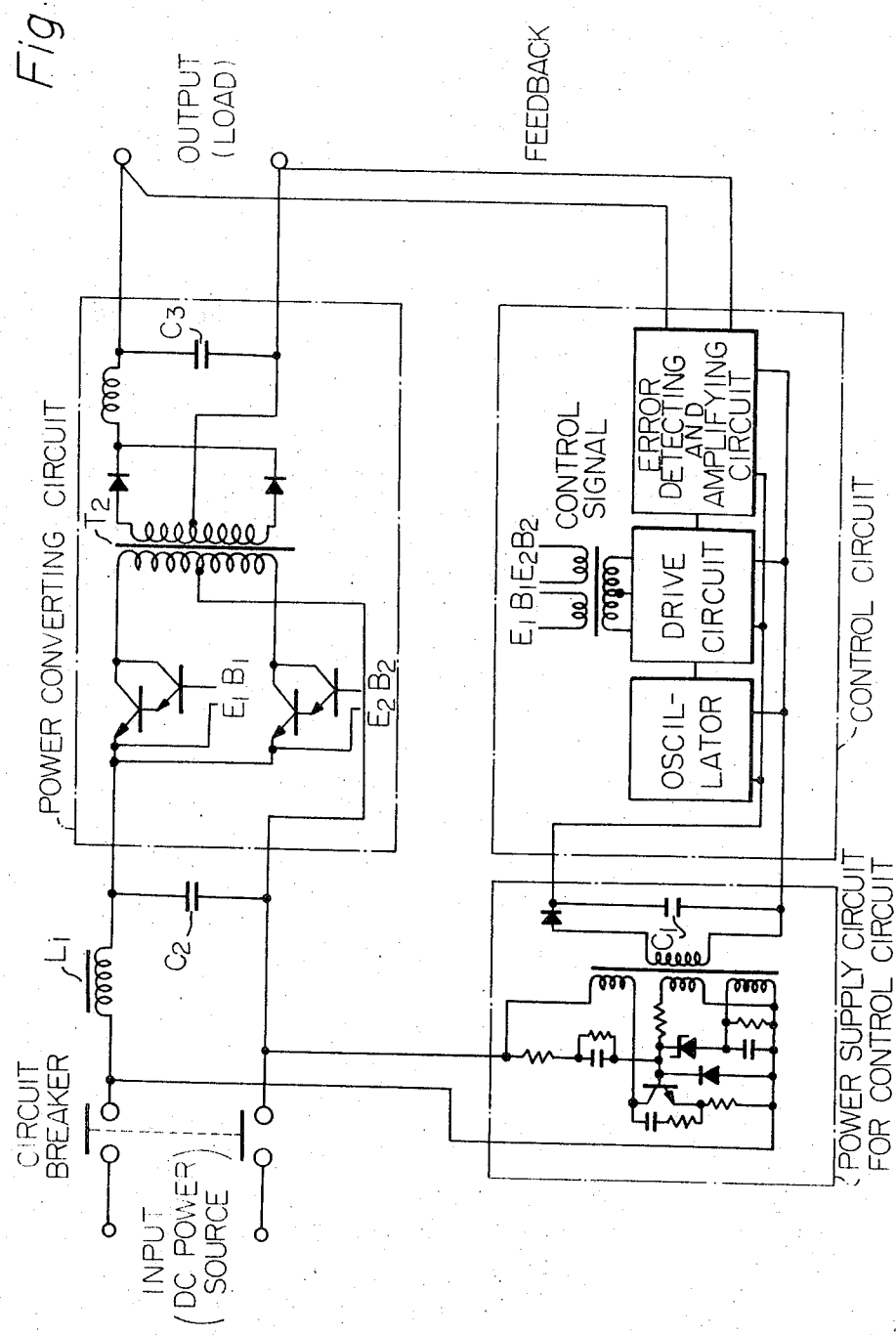
FIG. 2 shows a circuitry diagram of the conventional DC-to-DC converter.

An exemplary conventional DC-to-DC converter comprises, as shown in FIG. 2, a circuit breaker, a filter comprising a choke coil $L_1$ and a condenser $C_2$, a power converting circuit connected with said filter, a power supply circuit for the control circuit and connected to the circuit breaker, and a control circuit to which an electric power is supplied from said power supply circuit to drive the power converting circuit and to maintain the output voltage to be constant. Said control circuit comprises an error detecting and amplifying circuit to which a voltage fed back from the output of the power converting circuit is supplied, a drive circuit connected to the error detecting and amplifying circuit and an oscillator connected to the drive circuit. Te output from said power supply is fed to each of the said respective components of the control circuit. The oscillator generates pulses of a fixed frequency. The error detecting and amplifying circuit compares the output voltage from the electronic power converting circuit with a predetermined reference voltage, amplifies the differential voltage and supplies such amplified voltage to the drive circuit. The drive circuit generates a control signal in response to the pulses from the oscillator and the output fromt the error detecting and amplifying circuit, and transmits the control signal to each of two transistors provided in the power converting circuit.

The operation of the device shown in FIG. 2 shall be briefly explained in the following. When the circuit breaker is placed in its ON state, a voltage will be applied to the transistors of the power converting circuit through the filter of $L_1$ and $C_2$ and, at the same time, the voltage will be applied also to the power supply circuit for the control circuit. The output voltage of the power supply will be supplied to the control circuit and the control signal therefrom will switch the transistors in the power converting circuit alternately ON and OFF, so that the electric current flowing through one of the transistors will flow to the primary side of a transformer $T_2$ and thereby the secondary voltage of the transformer $T_2$ will be rectified and will appear on the output side of the power converter. In the device shown, the power supply circuit for the control circuit is generally complicated in the structure as seen in the drawing and has a defect that the device becomes large. The present invention is to improve this defect.

Figure 3:
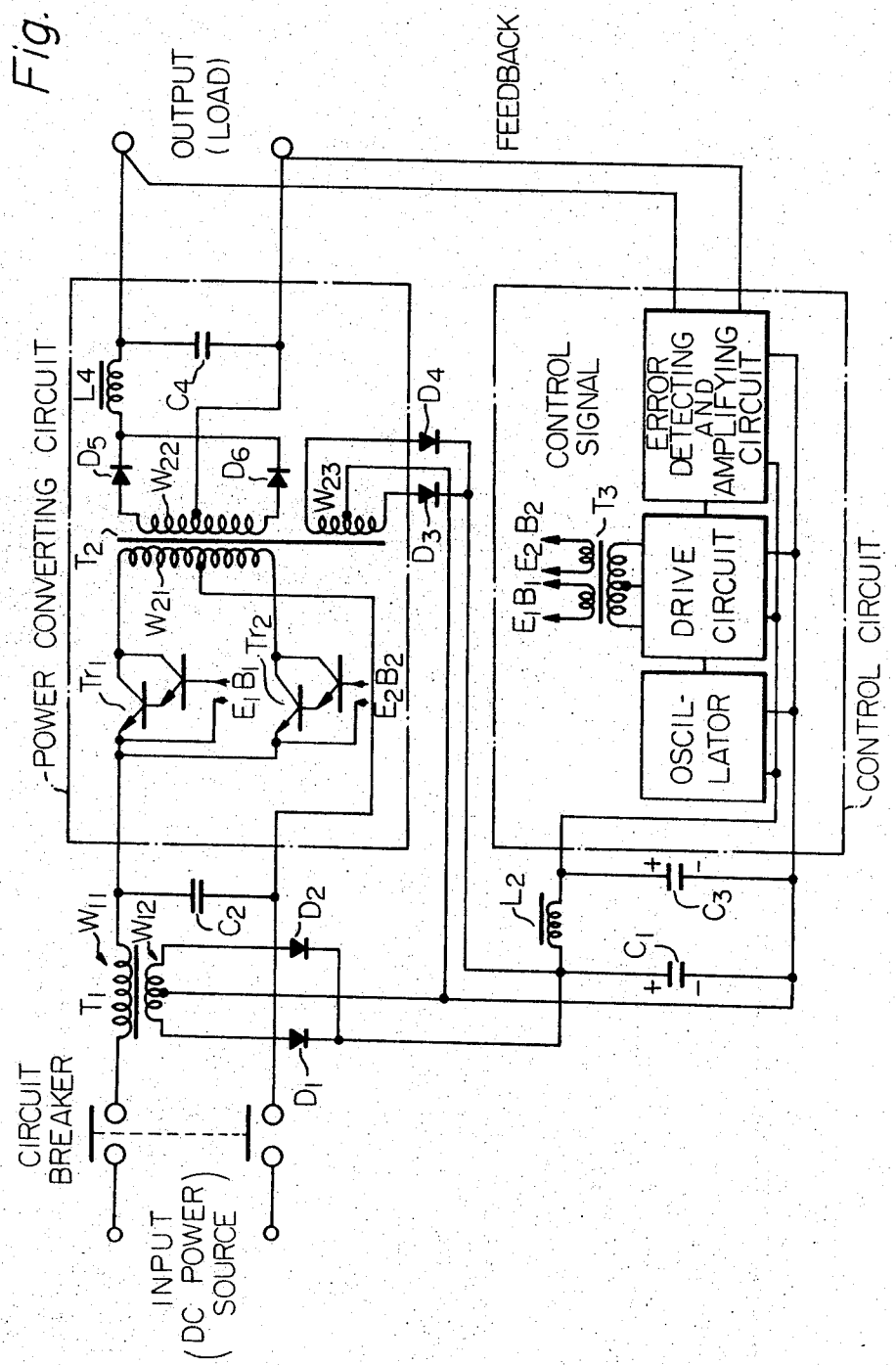
FIG. 3 shows in a circuitry diagram an embodiment of the DC-to-DC converter of the present invention.

In the embodiment of the present invention shown in FIG. 3, the minus terminal on the input side terminals of the device is connected to such switching elements as the transistors $Tr_1$ and $Tr_2$ at the respective emitters through the primary winding $W_{11}$ of a reactor $T_1$ through the circuit breaker, the collectors of these transistors $Tr_1$ and $Tr_2$ are connected respectively with both ends of the primary winding $W_{21}$ of the transformer $T_2$, and the neutral point of the primary winding $W_{21}$ is connected with the plus terminal of the input side terminals. The condenser $C_2$ which shall be referred to as a first condenser is connected between the power converting circuit side of the primary winding $W_{11}$ and the plus line. Further, both ends of the secondary winding $W_{22}$ of the transformer $T_2$ are connected with the plus terminal of the output side terminals of the device respectively through diodes $D_5$ and $D_6$ employed as rectifiers and commonly through a choke coil $L_4$ of an output side first filter comprising the coil $L_4$ and a condenser $C_4$, and the neutral point of the secondary winding $W_{22}$ is connected with the minus terminal of the output side terminals.

Both ends of the secondary winding $W_{12}$ of the above mentioned reactor $T_1$ are connected with the plus side of the condenser $C_1$, which shall be referred to as a second condenser, respectively through diodes $D_1$ and $D_2$ employed as rectifiers and the neutral point of said secondary winding $W_{12}$ is connected with the minus side of the second condenser $C_1$. Said condenser $C_1$ feeds an electric power source to the control circuit through a second filter comprising a choke coil $L_2$ and a condenser $C_3$.

Figure 6:
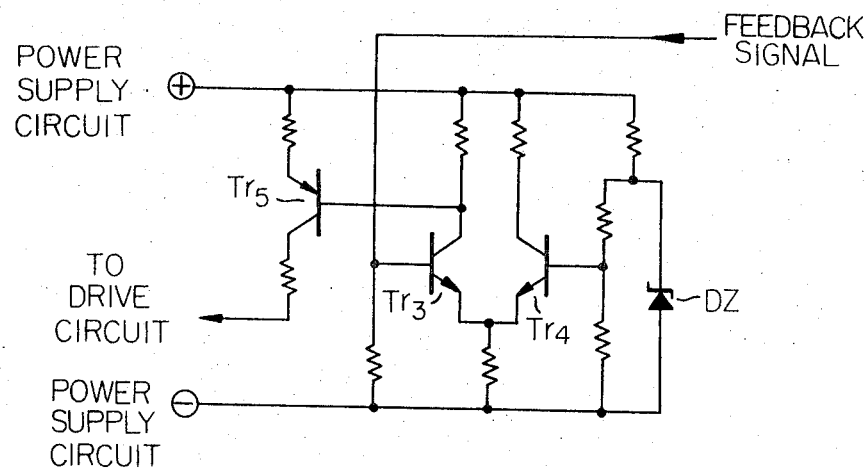
FIG. 6 shows in circuitry diagram an example of the error detecting and amplifying circuit employed in the present invention.
Figure 7:
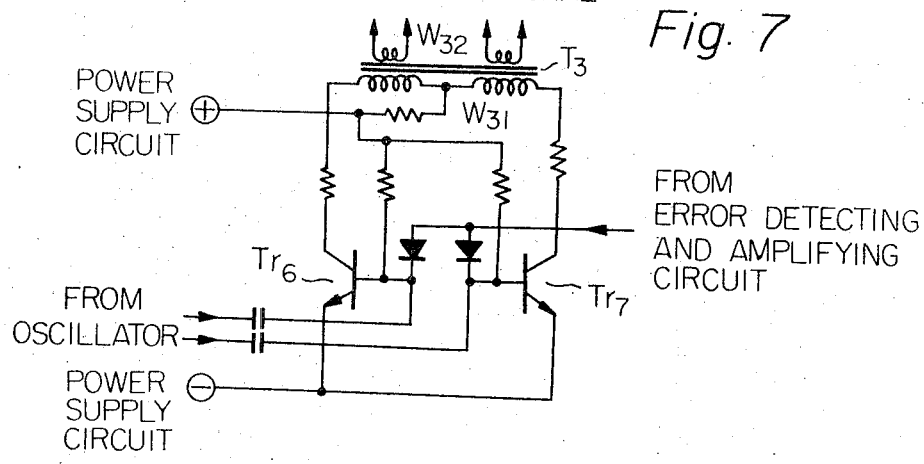
FIG. 7 shows in curcuitry diagram an example of the drive circuit employed in the present invention.

The control circuit comprises the oscillator, drive circuit and error detecting and amplifying circuit, of which formation and connection are the same as in the case of FIG. 2. For the oscillator within the control circuit, for example, a multivibrator is used. The function of the error detecting and amplifying circuit is the same as in the case of FIG. 2. For this circuit, for example, the circuit shown in FIG. 6 is used and for the drive circuit, for example, the circuit shown in FIG. 7 is used, which will be referred to later.

Both ends of the tertiary winding $W_{23}$ of the transformer $T_2$ are connected respectively through diodes $D_3$ and $D_4$ employed as rectifiers commonly to the plus side of the condenser $C_1$, and the neutral point of the tertiary winding $W_{23}$ is connected with the minus side of the second condenser $C_1$.

The operation of the device shown in FIG. 3 shall be explained in the following. When the circuit breaker is operated to close the contacts, a charging current will flow through the first condenser $C_2$ through the primary winding $W_{11}$ of the reactor $T_1$. By this charging current, an electric current will flow through the secondary winding $W_{12}$ of the reactor $T_1$, which current is then rectified by the diodes $D_1$ and $D_2$ and charges the condenser $C_1$. The voltage at both ends of this condenser $C_1$ will act as an power source voltage of the control circuit as fed through the filter of $L_2$ and $C_3$, and control signals will be generated on the secondary side of a transformer $T_3$ connected with the drive circuit, which signals are applied to the base of each of Darlington connection type transistors $T_1$ and $T_2$ so that the switching elements of transistors $Tr_1$ and $Tr_2$ will be switched alternately. Therefore, a direct current will flow alternately through the upper half and lower half of the primary winding $W_{21}$ of the transformer $T_2$ through the circuit breaker and an induced voltage will be generated in the secondary winding $W_{22}$ and applied to the output through the first filter of $L_4$ and $C_4$. An induced voltage will be generated also in the tertiary winding $W_{23}$ of the transformer $T_2$ and will be therefore rectified to be used as an electric power source of the control circuit. In other words, the control circuit will be first started by the charge current of the condenser $C_2$, and will recitfy the voltage induced in the tertiary winding of the transformer $T_2$ when a current flows through the primary winding of the transformer $T_2$ so as to use the rectified voltage as a power source for the control circuit. Further, the output side and input side of the transformer $T_2$ are perfectly insulated from each other and also the control circuit and the input side are insulated from each other by means of the reactor $T_1$.

Now, the voltage or current flowing through the respective parts at the time of the above described operation shall be explained.

Figure 4A:
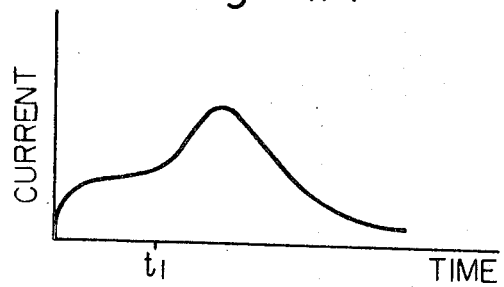
FIGS. 4A to 4D are wave form diagrams to explain the operation of the converter in FIG. 3.

FIG. 4A shows a current flowing through the primary winding $W_{11}$ of the reactor $T_1$ at the time of starting. The current capacity of the reactor $T_1$ is designed with the input current of the converter so as to be small and will be therefore evidently saturated in case a rush current flows through the condenser $C_1$. The saturation point is indicated by $t_1$. After it is saturated, there will be only a resistance component of such as a cloth wire or the like and a simple charge curve of the condenser will be drawn. Therefore, it is until the time $t_1$ that the reactor $T_1$ performes the function as of a reactor.

Figure 4B:
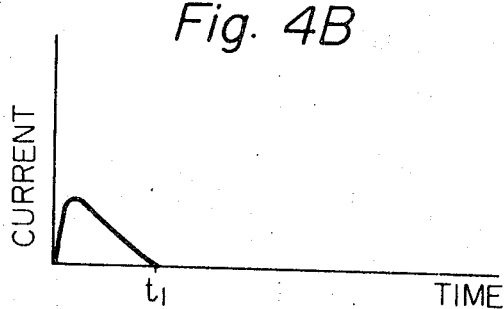
Figure 4C:
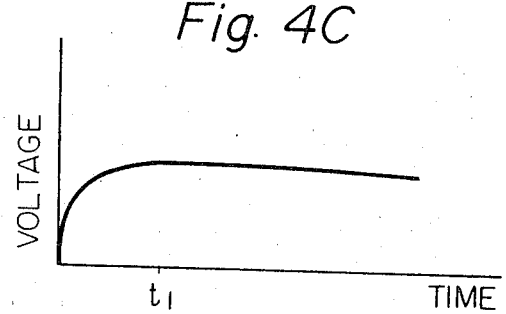

FIG. 4B shows a current flowing through the secondary winding of the reactor $T_1$, that is, a charging current of the condenser $C_1$. At the saturation point $t_1$, the output voltage vanishes and the charging current becomes zero. Meanwhile, the condenser $C_2$ will be charged and the voltage will rise to a predetermined voltage. This voltage is determined by the capacities of the condenser $C_1$ and $C_2$, the winding ratio of the reactor $T_1$ and the saturation characteristics of the core. The rush current of the condenser is so large, on the other hand, that it is easy to take out an energy sufficient to start the control circuit. Charging characteristics of the condenser $C_1$ are shown in FIG. 4C.

Figure 4D:
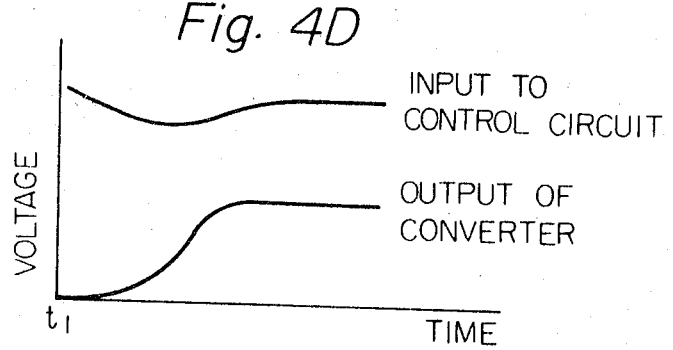

FIG. 4D shows the rises of the input voltage of the control circuit and the output voltage of the power converter in the case of the embodiment of FIG. 3. The control circuit voltage once reduces with the operation of the power converting circuit, but will rise again to maintain a defined value when the connecte power source begins to be fed.

With such ratings of the device as an input voltage = $-48V.\pm 5V.$, output voltage = $+5V. \pm 0.25V.$, output current capacity = $100A.$, $C_1 = 680 \mu F$, $C_2 = 15,000 \mu F$ and reactor $T_1 = 0.3 mH$, an experiment has shown that the control circuit of about 30W. could be started.

Figure 5:
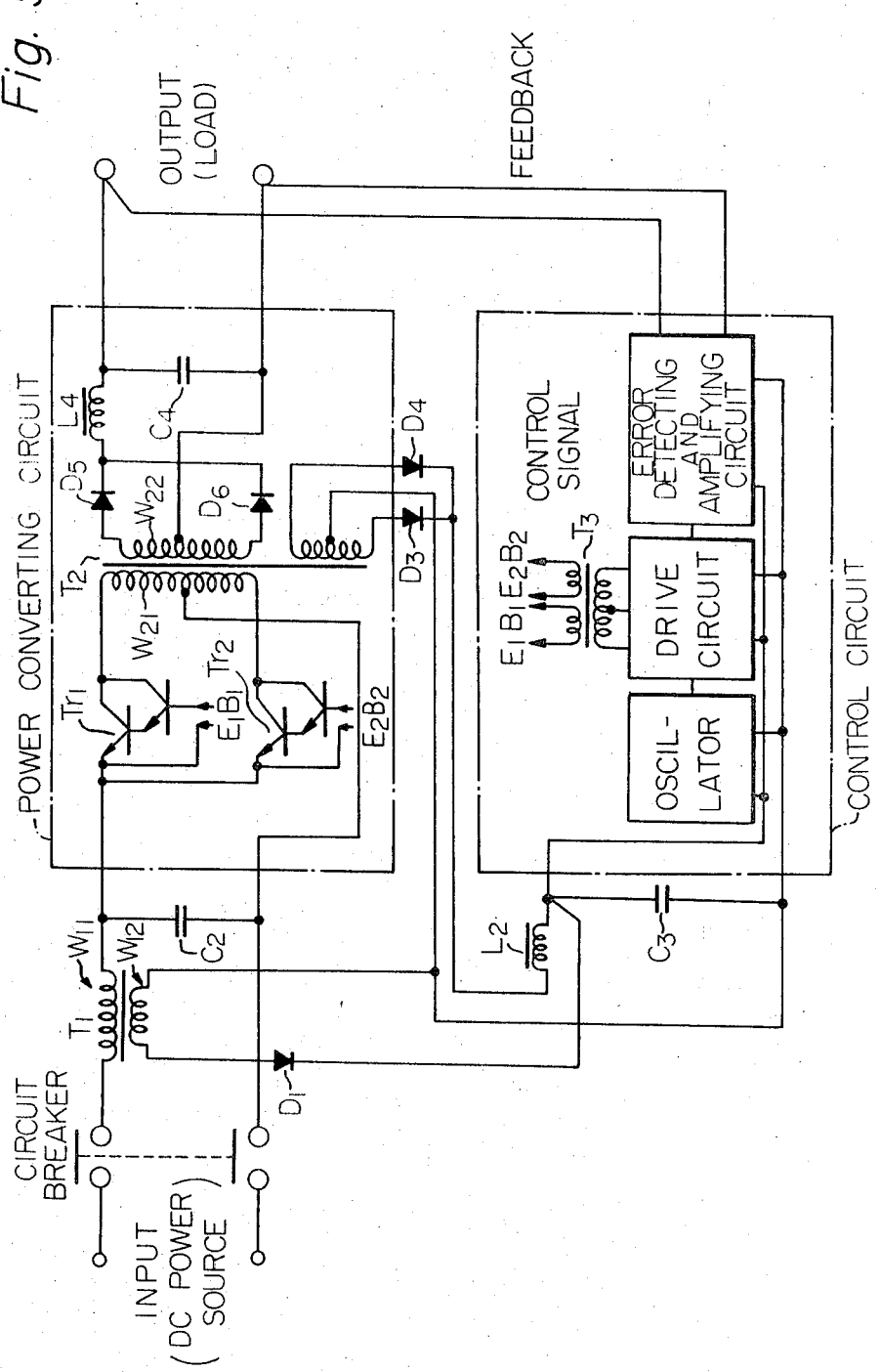
FIG. 5 shows another embodiment of the present invention.

In the other embodiment of the present invention as shown in FIG. 5, the second condenser $C_1$ in the embodiment of FIG. 3 is omitted and the voltage across the secondary winding $W_{12}$ of the reactor $T_1$ is applied directly to both ends of the condenser $C_3$ (corresponding to the condenser $C_3$ of the second filter in FIG. 3) through a single diode $D_1$, but the circuitry formation in other parts is the same as in the case of FIG. 3. As compared with that in FIG. 3, it will be seen that this circuitry formation omits the diode $D_2$ and condenser $C_1$. Therefore, it is possible to make the device much simpler than in the case of FIG. 3.

An example of the circuitry formation of the error detecting and amplifying circuit is as shown in FIG. 6. In this circuit, transistors $Tr_3$ and $Tr_4$ form a differential amplifying circuit. Their emitters are connected in common through a resistance to the minus side of the electronic power supply circuit for the control circuit, while the collectors are connected respectively through resistances to the plus side of the power supply circuit. A predetermined voltage obtained with a Zener diode $D_z$ is divided by two resistances connected respectively to both ends of the diode $D_z$ and thus divided voltage is applied as a reference voltage to the base of the transistor $Tr_4$ connected between said resistances. The base of the transistor $Tr_5$ is connected with the collector of the transistor $Tr_3$ and the emitter of sait transistor $Tr_5$ is connected with the plus side of the power supply circuit. Further, the collector of the transistor $Tr_5$ is connected with the such drive circuit as shown in FIG. 7.

When a feedback signal is applied to the base of the transistor $Tr_3$, the differential voltage from the reference voltage will be detected and will appear in the collector of the transistor $Tr_3$. If this voltage is impressed on the base of the transistor $Tr_5$, the output impedance of the transistor $Tr_5$ will vary. The drive circuit is controlled by utilizing the variation of this impedance.

An example of circuit formation of the drive circuit is shown in FIG. 7. In this circuit, the emitters of the transistors $Tr_6$ and $Tr_7$ are connected directly with the minus side of the electric power supply circuit for the control circuit and their collectors are connected with both ends of the primary winding $W_{31}$ of the transformer $T_3$ respectively through a resistance. The secondary winding $W_{32}$ of said transformer $T_3$ is connected with the base circuits of the transistors $Tr_1$ and $Tr_2$ in the power converting circuit.

A signal from an oscillator formed, for example, of a multivibrator is supplied to the bases of the transistors $Tr_6$ and $Tr_7$ to switch the transistor $Tr_6$ and $Tr_7$ ON and OFF alternately. By these ON and OFF switching of the transistors $Tr_6$ and $Tr_7$, a control signal is transmitted out to the electric power converting circuit through the transformer $T_3$. At the same time, a signal from the error detecting and amplifying circuit is also supplied to the bases of the transistors $Tr_6$ and $Tr_7$ respectively through the diodes $D_7$ and $D_8$ to control the time period of "ON" state of the transistors $Tr_6$ and $Tr_7$. Therefore, in response to the fluctuation of the loading voltage, the pulse width is controlled to maintain the output voltage to be constant.

While the present invention has been explained in the abobe with reference to certain preferable embodiments, it should be understood that the present invention is not to be limited to the particular embodiments shown, but the intention is rather to include various modifications and equivalent arrangements to be included in the scope of the appended claims.

What is claimed is:

1. In a DC-to-DC converter having the input and output sides insulated from one another and comprising a DC power source, an electronic power converting circuit, a control circuit for controlling said electronic power converting circuit, an electronic power supply circuit for said control circuit for starting the electronic power converting circuit and a load, the electronic power supply circuit for the control circuit comprising
   a. a first means comprising a reactor having the primary and secondary windings, said primary winding being connected in series with one of power lines on the input side of the power converter, and said secondary winding being adapted to take out an energy in response to a rush current at the time of the application of a DC input from the power source, and
   b. a second means comprising a condenser connected with the secondary winding of said reactor so as to store said energy and to feed the energy to the control circuit and a means of taking a part out of the output of the electronic power converting circuit and feeding said partial output continuously to said condenser and the electronic power converting circuit comprising a transformer having primary, secondary and tertiary windings, said tertiary winding being connected at both ends through a rectifier to the positive terminal of said condenser, and the neutral point of said tertiary winding being connected to the negative terminal of said condenser.

2. In a DC-to-DC converter having the input and output sides insulated from one another and comprising a DC power source, an electronic power converting circuit, a control circuit for controlling said electronic power converting circuit, an electronic power supply circuit for said control circuit for starting the electronic power converting circuit and a load, the electronic power supply circuit for the control circuit comprising
   a. a first means comprising a reactor having the primary and secondary windings, said primary winding being connected in series with one of power lines on the input side of the power converter, and said secondary winding being adapted to take out an energy in response to a rush current at the time of the application of a DC input from the power source, and
   b. a second means comprising a condenser connected with the secondary winding of said reactor so as to store said energy and to feed the energy to the control circuit and a means of taking a part out of the output of the electronic power converting circuit and feeding said partial output continuously to said condenser, said electronic power converting circuit comprises a transformer having primary, secondary and tertiary windings, said tertiary winding being connected at one end through a rectifier to the positive terminal of said condenser and at the other end to the negative terminal of said condenser.

3. A DC-to-DC converter comprising
   a. a DC power source,
   b. a circuit breaker connected with said power source,
   c. a reactor having the primary and secondary windings, said primary winding being connected at one end with one of power lines from said circuit breaker,
   d. a first condenser connected between the other end of said primary winding of the reactor and the other one of the power lines from the circuit breaker,
   e. an electronic power converting circuit connected on the input side with both ends of said first condenser, said power converting circuit including a transformer having the primary, secondary and tertiary windings insulated from one another and a first filter, said primary winding being connected at both ends respectively through a switching element with one end of said first condenser and at the neutral point with the other end of said first condenser, and said secondary winding of the transformer being connected at both ends respectively through a rectifier with the plus side of said first filter and at the neutral point with the minus side of the first filter,
   f. a second condenser connected on the plus side with both ends of the secondary winding of the reactor respectively through a rectifier, said secondary winding being connected at the neutral point with the minus side of said second condenser, and said tertiary winding of the transformer in the power converting circuit being connected at both ends respectively through a rectifier with the plus side of the second condenser and at the neutral point with the minus side of the second condenser, and g. a control circuit connected to both ends of said second condenser through a second filter, said control circuit comprising an oscillator generating pulses of a fixed frequency, an error detecting and amplifying circuit for comparing the output voltage from the power converting circuit with a reference voltage and detecting and amplifying the differential voltage, and a drive circuit for providing a control signal to said switching elements in the power converting circuit in response to signals from said oscillator and error detecting and amplifying circuit.

4. A DC-to-DC converter comprising
a. a DC power source,
b. a circuit breaker connected with said power source,
c. a reactor having the primary and secondary windings, said primary winding being connected at one end with one of power lines from said circcuit breaker,
d. a first condenser connected between the other end of said primary winding of the reactor and the other one of the power lines,
e. an electric power converting circuit connected on the input side with both ends of said first condenser, said power converting circuit including a transformer having the primary, secondary and tertiary windings insulated from one another and a first filter, said primary winding being connected at both ends respectively through a switchin element with one end of said first condenser and at the neutral point with the other end of said first condenser, and said secondary winding of the transformer being connected at both ends respectively through a rectifier with the plus side of said first filter and at the neutral point with the minus side of the first filter,
f. a second condenser connected on the plus side with one end of the secondary winding of the reactor through a rectifier, the other end of said secondary winding being connected at the other end with the minus side of said second condenser, and said tertiary winding of the transformer in the power converting circuit being connected at one end through a rectifier with the plus side of the second condenser and at the other end with the minus side of the second condenser, and
g. a control circuit connected directly to both ends of said second condenser, said control circuit comprising an oscillator generating pulses of a fixed frequency, an error detecting and amplifying circuit for comparing the output voltage from the power converting circuit with a reference voltage and detecting and amplifying the differential voltage, and a drive circuit for providing a control signal to said switching elements in the power converting circuit in response to signals from said oscillator and error detecting and amplifying circuit.

* * * * *